Figure 1:
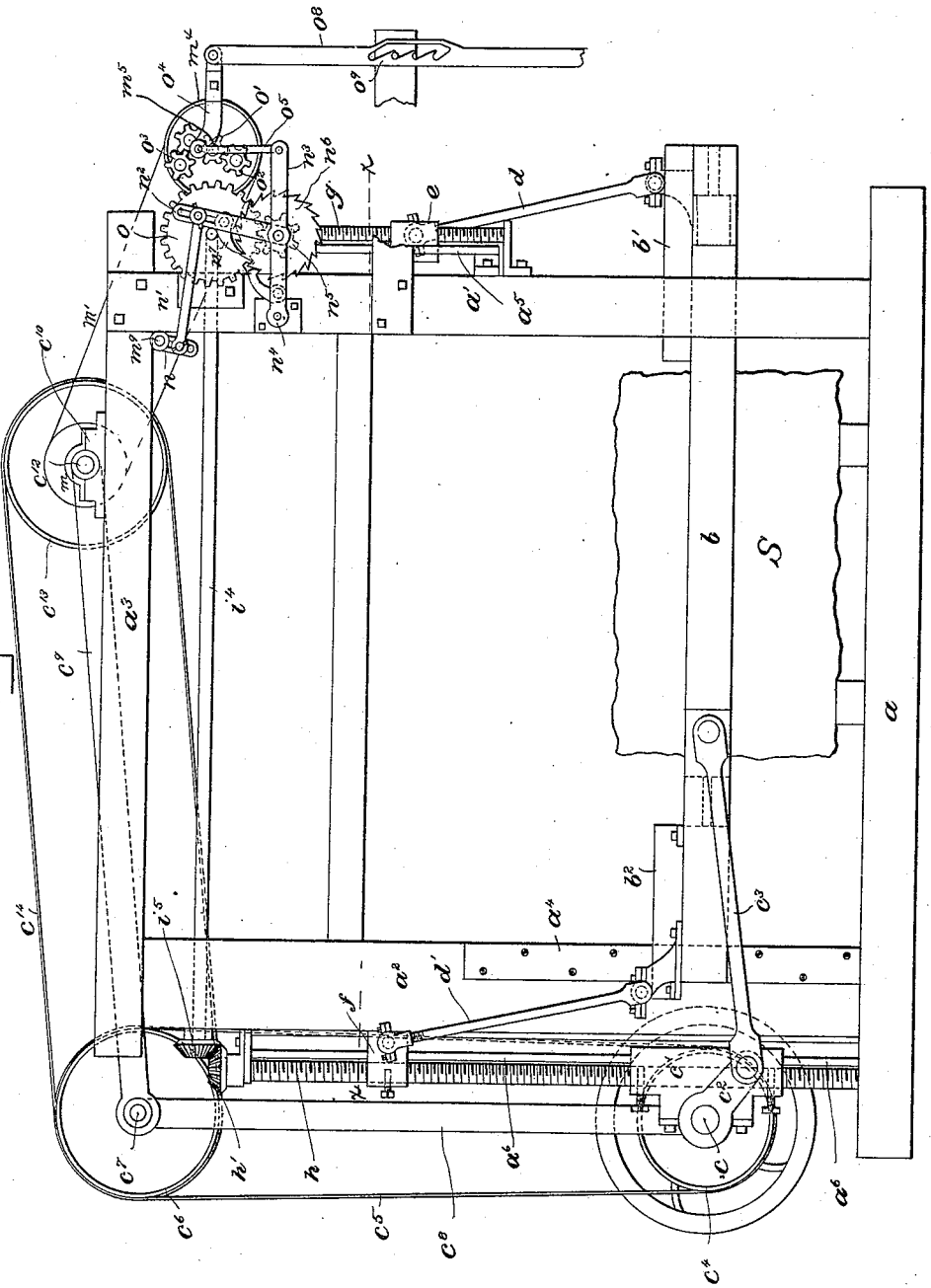

(No Model.)   2 Sheets—Sheet 1.

J. H. FRENIER.
APPARATUS FOR SAWING STONE.

No. 333,510.    Patented Jan. 5, 1886.

Witnesses.
John F. Nelson.
John F. C. Prinklett

Inventor.
John H. Frenier.
by Crosby & Gregory attys.

N. PETERS, Photo-Lithographer, Washington, D. C.

(No Model.) 2 Sheets—Sheet 2.
J. H. FRENIER.
APPARATUS FOR SAWING STONE.
No. 333,510. Patented Jan. 5, 1886.
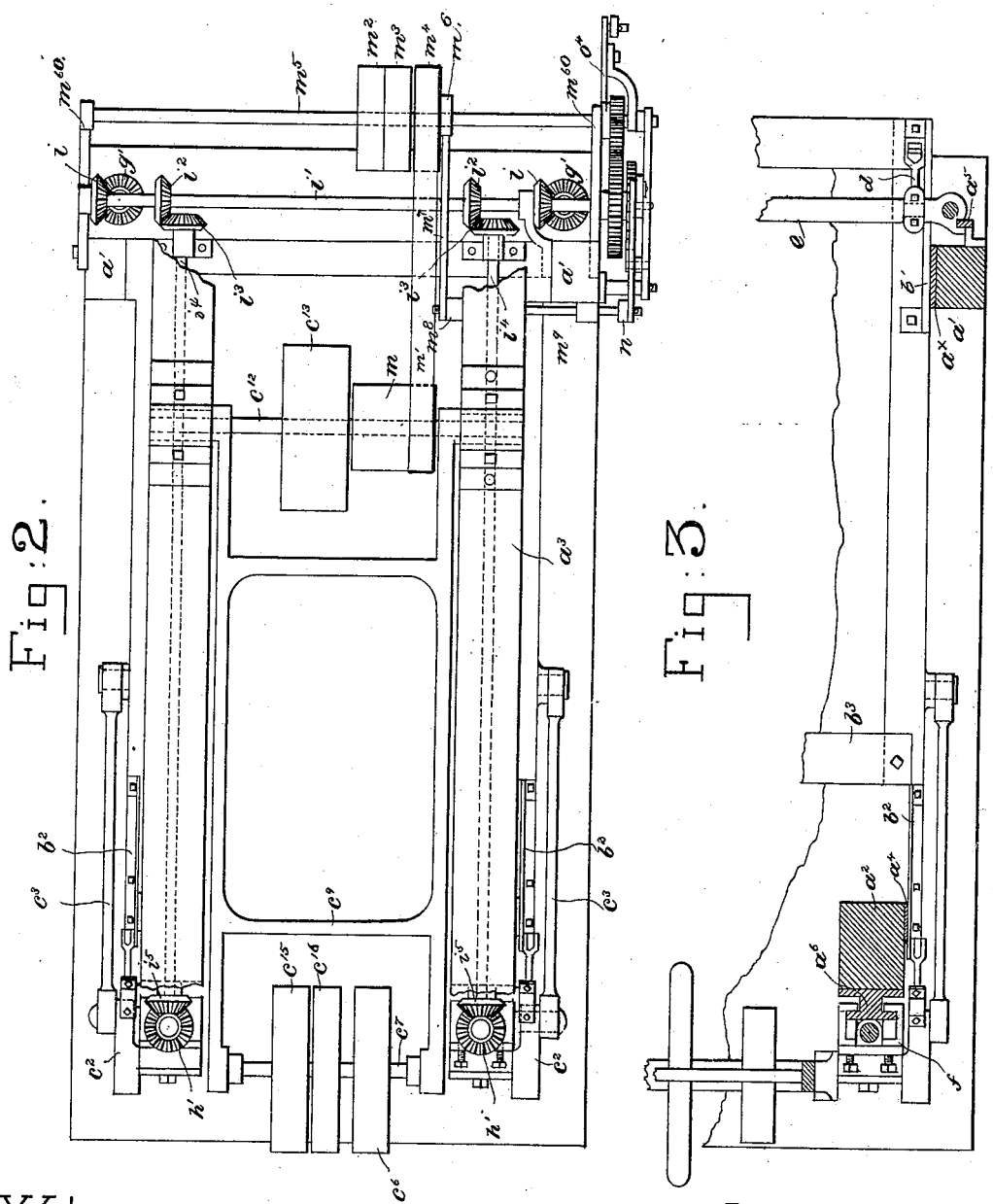

UNITED STATES PATENT OFFICE.

JOHN HENRY FRENIER, OF RUTLAND, VERMONT.

APPARATUS FOR SAWING STONE.

SPECIFICATION forming part of Letters Patent No. 333,510, dated January 5, 1886.

Application filed February 9, 1885. Serial No. 155,408. (No model.)

*To all whom it may concern:*

Be it known that I, JOHN H. FRENIER, of Rutland, county of Rutland, State of Vermont, have invented an Improvement in Apparatus for Sawing Stone, of which the following description, in connection with the accompanying drawings, is a specification, like letters on the drawings representing like parts.

My invention relates to an apparatus for sawing stone of that class in which a gang of saw-blades in a common sash or frame are reciprocated across the stone held stationary on a bed, thereby cutting the said stone into a number of slabs at a single operation. The saw-frame is suspended at its ends upon radius bars or links, so that the saw-blades move in a curved path or rise at the ends of each stroke; and in order that the saws may gradually cut down through the stone from the top to the bottom the said supporting-links are caused to descend gradually by a suitable feeding mechanism. The saw-frame is reciprocated or swung back and forth on its links by a pitman or connecting-rod from a crank on an actuating-shaft, and in order to properly operate the saw the said crank-shaft should rise or fall with the supporting-links of the saw-frame as the latter is fed downward through the stone or is raised to receive a new stone beneath it in position to be cut.

The present invention has for its object to simplify the construction of the sawing apparatus, making it more compact and convenient for use, as well as reducing the expense of construction.

The invention consists, essentially, in an apparatus composed of a main stationary frame with guides for steadying and guiding the reciprocating or swinging saw-frame in its movement, and also with guides for the vertically-moving saw-frame supports and crank-shaft bearings, combined with feeding mechanism common to the saw-frame support and crank-shaft bearings, whereby both are moved upward and downward simultaneously. Means are also provided for transmitting the power from a shaft on the stationary frame-work to the movable crank-shaft. In this instance of my invention the feed is produced by vertical screws, and the links supporting one end of the saw-frame are themselves supported on nuts engaging the screws at one end of the frame, and the crank-shaft is also supported on nuts engaging the same screws which support and feed the adjacent end of the saw-frame.

Figure 1 is a side elevation of a machine for sawing stone embodying my invention; Fig. 2, a plan view thereof; and Fig. 3 a partial horizontal section on line $x\ x$, Fig. 1, showing a portion of the saw-frame in plan.

The main frame consists of a bed or supporting portion, $a$, resting on the ground and adapted to receive upon it the stone S to be cut into slabs, the said bed having uprights $a'$ $a^2$, connected by suitable beams, $a^3$, and serving to support the actuating and feeding mechanism for the saw frame or sash $b$. The uprights $a'$ at one end of the main frame support one end of the saw-frame, and the uprights $a^2$ at the other end of the main frame support the other end of the saw-frame, and also support the crank-shaft $c$. The uprights $a'$ are provided with guide-plates $a^x$, co-operating with guide-plates $b'$ on the adjacent end of the saw-frame, to guide the latter steadily in its reciprocating movement, the saw-frame being contained between the uprights $a'$. The uprights $a^2$ are provided at their outside with guide-plates $a^4$, co-operating with guide-plates $b^2$, connected with the saw-frame, the said guide plates $b^2$ extending beyond the cross-head $b^3$ at the adjacent end of the saw-frame, as best shown in Fig. 3, the said frame not passing the uprights $a^2$ in its swinging movement. The saw-frame $b$ is supported at its ends upon links $d\ d'$, the former pivoted upon a cross-bar, $e$, and the latter upon blocks or carriages $f$, constituting the vertically-movable saw-frame supports. The cross-head $e$ engages guides $a^5$ on the uprights $a'$, (see Fig. 3,) which steady the cross-head in its vertical movement, and the blocks $f$ engage suitable guides, $a^6$, on the uprights $a^2$, guiding the said blocks in their vertical movement. The crank-shaft $c$ has its bearings in carriages $c'$, also adapted to slide in the guides $a^6$ for the saw-frame-supporting blocks $f$, and the said shaft is provided with cranks $c^2$, each connected by a pitman or connecting-rod, $c^3$, with the saw-frame $b$, so that as the said crank-shaft rotates it actuates the saw-frame with a reciprocating movement. The saw-frame $b$ has to be raised above the stone before the cutting operation begins, and then has to feed gradually downward through the stone in cutting the same; and in order to maintain the proper relation between the shaft $c$ and the saw-frame the said crank-shaft will also have to be raised or lowered in conjunction with the saw-frame. This vertical or feeding movement, as shown in this instance, is effected by feeding-screws $g$ $h$, provided with beveled pinions $g'$ $h'$, the former meshing with beveled pinions $i$ or a shaft, $i'$, transverse to the main frame-work, and provided with beveled pinions $i^2$, meshing with beveled pinions $i^3$ on the shafts $i^4$, extending lengthwise of the framework, and provided with beveled pinions $i^5$, meshing with the pinions $h'$, connected with the screws $h$, the said gearing being such that the screws $g$ $h$ are all turned simultaneously and uniformly. The feed-screws $g$ engage nuts in the cross-head $e$, supporting the links $d$ at one end of the saw-frame, and the screws $h$ operate in nuts connected with the blocks $f$, supporting the other end of the saw-frame, and also in nuts connected with the carriages $c'$, supporting the bearings for the crank-shaft $c$, so that the latter moves in unison with the blocks $f$, being always maintained at the same distance therefrom. The crank-shaft $c$ is provided with a pulley, $c^4$, connected by a belt, $c^5$, with a pulley, $c^6$, on a shaft, $c^7$, having bearings in a frame, $c^8$, itself supported at one end on the crank-shaft $c$ or bearings thereof, so that the said frame $c^3$ rises and falls with the crank-shaft $c$, maintaining the pulley $c^6$ at uniform distance from the pulley $c^4$ in such movement. The pulley $c^6$ also has bearings in or is connected with a frame, $c^9$, having its other end supported and free to turn in stationary bearings $c^{10}$ on the main frame-work, the said bearings $c^{10}$ also supporting a main actuating-shaft, $c^{12}$, provided with a pulley, $c^{13}$, connected by a belt, $c^{14}$, with one or the other of a pair of fast and loose pulleys, $c^{15}$ $c^{16}$, on the shaft $c^7$, the end of the frame $c^9$, supported on the said shaft $c^7$, rising and falling therewith, and keeping the pulleys $c^{15}$ $c^{16}$ at uniform distance from the pulley $c^{13}$ on the shaft $c^{12}$ in the stationary bearings.

The screws $g$ $h$ are rotated simultaneously through the bevel-gearing described to produce the feed of the saw-frame and crank-shaft downward by the following mechanism: A pulley, $m$, on the shaft $c^{12}$ is connected by belt $m'$ with one of three pulleys, $m^2$ $m^3$ $m^4$, on a shaft, $m^5$, supported in suitable bearings, $m^{10}$, from the main frame-work. One of the pulleys $m^2$ $m^3$ is fast and the other loose on the said shaft $m^5$, and the pulley $m^4$ is loose on the said shaft, and provided with an eccentric, $m^6$, having a rod, $m^7$, connected with an arm, $m^8$, from a rock-shaft, $m^9$, provided with an arm, $n$, connected by a link, $n'$, (see Fig. 1,) with a pawl-carrying arm, $n^2$, pivoted on a frame, $n^3$, itself pivoted on the main frame-work at $n^4$, and supporting a pinion, $n^5$, having connected with it a ratchet, $n^6$, adapted to be engaged by the pawl $n^7$ on the pawl-carrier $n^2$, so that the said ratchet and connected pinion $n^5$ are rotated intermittingly as the pawl-carrier $n^2$ is oscillated back and forth by the connecting mechanism between it and the eccentric $m^6$, connected with the pinion $m^4$.

When the frame $n^3$ is in the position shown in Fig. 1, the pinion $n^5$ meshes with a gear, $o$, on the shaft $i'$, so that the said shaft is caused to rotate intermittingly, and by the connected gearing to turn the feed-screws $g$ $h$ in the direction to lower the said frame and crank-shaft. The shaft $m^5$ is provided with a pinion, $o'$, meshing at one side with a single intermediate, $o^2$, and at its other side with a pair of intermediates, $o^3$, all having their bearing on a frame, $o^4$, pivoted to turn around the axis of the shaft $m^5$, so as to throw either the intermediate $o^2$ or one of the intermediates $o^3$ into engagement with the gear $o$.

The frame $n^3$, supporting the pinion $n^5$, is connected by a link, $o^5$, with the frame $o^4$, so that when the said frame $o^4$ is turned in either direction to throw one or the other of the intermediates into engagement with the gear $o$ the frame $n^3$ is lowered, and the pinion $n^5$ is thrown out of engagement with the gear $o$. Then by placing the belt driven from the pulley $m$ on the pulley $m^2$ or $m^3$, that is fast on the shaft $m^5$, the latter, together with the pinion $o'$ and intermediates, will be rotated, turning the gear $o$ rapidly in one or the other direction, according as one or the other of the intermediates is engaged therewith, thus enabling the saw-frame and crank-shaft to be rapidly raised or lowered while the saws are not acting on the stone.

The frame $o^4$ is moved to the different positions to cause the rapid upward or downward movement thereof by a handle, $o^8$, provided with a series of stops, $o^9$, by which it may be retained in the proper position to cause the desired one of the feeding or frame-moving operations to take place.

The invention is not limited to the exact construction herein shown, as it may be modified in various ways. The carriages $c'$ and blocks $f$ might be rigidly connected together or constitute a single frame-work having but one set of nuts co-operating with the feed-screws $h$, and it is not essential that the saw-frame should move in a curved path.

I do not herein claim, but reserve for my application Serial No. 184,451, filed December 2, 1885, a stone-sawing machine having the intermittent feed mechanism supporting frame $n^3$ and the reversing continuous feed mechanism supporting frame $o^4$, positively connected, so that the adjusting of one frame automatically adjusts the other; neither do I herein claim a feeding mechanism comprising the frame $n^3$ and gearing, and the frame $o^4$, provided with the pinions $o'$ $o^2$ $o^3$ and crank-arm $p$, and the link $o^5$, connecting the two frames, and a handle connected to one of the frames to operate it, the other frame being automatically operated from the frame first named through its described connection therewith.

I claim—

1. In a sawing-machine, a single main frame provided with upright guides at its ends, combined with a saw-frame, supports movable vertically on said guides, links pivoted to said supports and the saw-frame, an actuating crank-shaft, the pitman $c^3$, connecting the crank-shaft and saw-frame, the screw-rods $g\ h$, the latter common to both the saw-frame and crank-shaft, and connecting-gearing for said rods, and means to operate said gearing, substantially as described.

2. The saw-frame and its vertically-movable supports or blocks, and pivoted connecting-links, combined with the actuating crank-shaft, its connecting-rod $c^3$, and vertically-movable supports, and the screw-rods $h$, common to both the said saw-frame and crank-shaft, movable supports or blocks, and the mechanism to rotate said screw-rods $h$, whereby both saw-frame and crank-shaft are moved vertically in unison, substantially as described.

3. The main frame-work and main shaft $c^{12}$, having stationary bearings on said frame-work, and provided with a pulley, $c^{13}$, the crank-shaft $c$, and means to move it vertically on said frame-work, combined with a pulley, $c^6$, and its two supporting-frames, $c^8$ and $c^9$, the former moving with the vertical movement of the crank-shaft, and the latter having a pivotal movement on the main shaft, a pulley, $c^4$, on the crank-shaft, and belts $c^5\ c^{14}$, connecting the pulley $c^4$ through the pulley $c^6$ with the driving-shaft pulley, substantially as described.

4. The main frame-work of a stone-sawing machine, having uprights provided with means to guide and vertically adjust the forward end of the saw-frame, combined with guides $a^4$ on the main frame, and guides $b^2$ extending beyond the rear end of the saw-frame and embracing said guides $a^4$, and means to adjust the rear end of the saw-frame harmoniously with the adjustment of the forward end, substantially as described.

5. In a sawing-machine, a single main frame provided with upright guides at its ends, combined with a saw-frame, supports movable vertically on said guides, links pivoted to said supports and the saw-frame, an actuating crank-shaft, the pitman $c^3$, connecting the crank-shaft and saw-frame, the screw-rods $g\ h$, the latter common to both the saw-frame and crank-shaft, and connecting-gearing for said rods, and means to operate said gearing, and a reversing feed mechanism for controlling the motion of said gearing, substantially as described.

6. In a stone-sawing machine, the main frame-work having uprights $a^2$, provided with guides $a^4$, combined with the reciprocating saw-frame having guides $b^2$ extending beyond one of its ends and embracing the co-operating guides $a^4$ of the uprights between them, and the actuating crank-shaft $c$, and its bearing carriages $c'$, movable vertically upon the said uprights, substantially as described.

7. In a stone-sawing machine, the main frame having uprights provided with guides $a^5\ a^6$, combined with the saw-frame, and supporting blocks thereof movable on the said guides, and the actuating crank-shaft $c$, having a carriage, $c'$, also movable on the same guides that serve for one end of the same frame, and the screw-rods $h$, engaging the blocks and carriage, and mechanism to rotate said screw-rods, whereby one end of the saw-frame and the crank-shaft are vertically moved in unison, substantially as described.

In testimony whereof I have signed my name to this specification in the presence of two subscribing witnesses.

JOHN HENRY FRENIER.

Witnesses:
FRANK W. GARY,
HOMER L. HOÖG.